Figure 1:
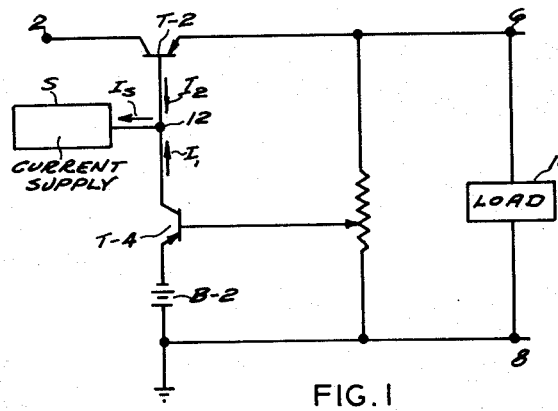

Jan. 8, 1963   R. A. VAUGHN   3,072,842
POWER SUPPLY PROTECTION DEVICE
Filed July 1, 1960

ROBERT A. VAUGHN
INVENTOR

BY *Richard H. Stephens*

ATTORNEY

United States Patent Office 3,072,842
Patented Jan. 8, 1963

3,072,842
POWER SUPPLY PROTECTION DEVICE
Robert A. Vaughn, Binghamton, N.Y., assignor to General Precision, Inc., a corporation of Delaware
Filed July 1, 1960, Ser. No. 40,227
16 Claims. (Cl. 323—22)

The present invention relates to power supply protection devices, and in particular, to transistor circuits for protecting direct-current transistorized voltage regulator circuits by preventing destruction of such circuits by overloads.

There are many applications in the electrical arts which requires D.C. power supplies capable of providing voltages which maintain a constant value while providing a wide range of output current. Since batteries, rectifiers, and other sources of direct current have internal resistances which cause variations in their internal IR drop with changes in current flow, and consequently in the output potential available to supply the load, voltage regulators must be imposed between the source and the load circuits to compensate for the source impedance drop in order to supply relatively constant output voltage to the load. Such voltage regulators must be protected from overload conditions, i.e. the requirement by the load for excessive amounts of power. Such protection frequently has been afforded for vacuum tube circuits by use of simple fuses in series with the supply voltage. The response time of most fuses is too long to adequately protect transistors, however, especially if a series regulator transistor must normally by operated near its rated power dissipation, as is frequently the case in high current supplies. Some overload protection can be provided by operating transistors in parallel, but the number of transistors required may soon become prohibitively expensive where loads requiring high current are to be supplied.

Among the prior art voltage regulators which have employed transistor circuits to prevent overloads have been a group or class of differential amplifiers the characteristics of which may be changed as a function of the output current. By changing the characteristics of the differential amplifiers as a function of the output current, it is possible with this former art to obtain a degree of protection for overload conditions. The present invention employs an entirely different principle, however, and insofar as protection from overload is concerned it is not related to this prior art.

Another way in which overload protection has been obtained in voltage regulators employing transistors has been through the use of a current limiting transistor. This method has severe limitations of a practical nature, since the current limiting transistor must be able to dissipate a large amount of power and must have a power rating exceeding the power to be delivered to the load. For high-current supplies, this method usually requires that several transistors be paralleled, which frequently is prohibitively expensive. The present invention dispenses with the need for a number of expensive high capacity transistors.

It is an object therefore of this invention to provide improved overload protection for voltage regulators employing transistor circuits.

It is another object of this invention to provide an output network for voltage sources which acts safely with high speed to maintain output voltage constant over a wide current range.

It is an additional object of this invention to provide a regulating line transistor for a voltage circuit with a shaping network which can provide an output voltage characteristic which is substantially constant over a wide current range, and which is of such shape that when the current passes beyond said range the total power supplied will decrease so that the transistor will not absorb heat in a destructive amount.

It is still another object of this invention to provide a transistorized voltage regulator which is sensitive to changes in load and which supplies a substantially constant potential over a wide range of load current while preventing the power delivered to the load from exceeding a safe maximum after a certain current level has been attained.

It is yet another object of this invention to provide, for a transistorized voltage regulator, a shaping circuit to prevent the power supply from supplying power to the extent that it will cause damage to the transistors.

It is yet an additional object of this invention to provide a device to protect transistorized voltage regulators for decreasing the voltage across the load to zero almost instantaneously following an overload of the supply.

The foregoing objects and others ancillary thereto I prefer to attain as follows:

This invention embodies a transistor voltage regulator employing a differential amplifier which compares the output potential from the regulator with a reference potential. It employs the resulting difference signal to regulate the resistance of a transistor in series between a D.C. power supply and the load circuit to thereby change the current available to the load with variations in load and at the same time to keep the voltage appearing across the load at a substantially constant value. Such a circuit without some overload protection can quickly be destroyed if the load demands the delivery of more power than the transistor can handle. As has previously been indicated, the time constant of ordinary fuses is too long to protect most transistor circuits, since the transistor would be destroyed before the fuse will be blown. In order to prevent such overloads of circuits, therefore, a transistorized shaping circuit has been invented which, in response to increases in current beyond a certain level and subsequent falling off of voltage beyond that level, will reshape the voltage-current relationships appearing across the output terminals of the regulator so as to prevent the power delivered to the load from ever exceeding the maximum power permissible for the transistors in the regulator circuit.

Figure 2:
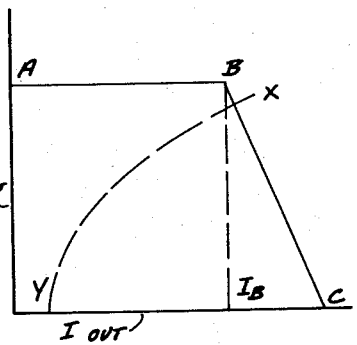
Figure 3:
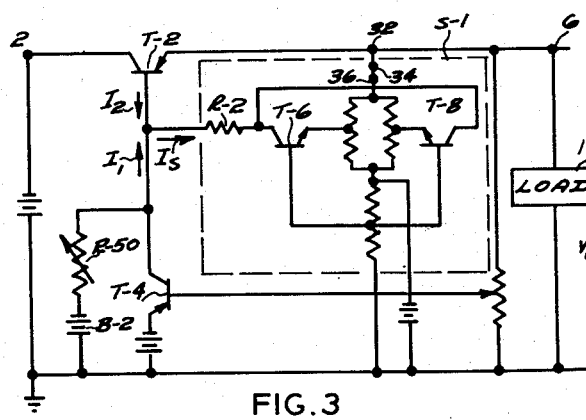
Figure 4:
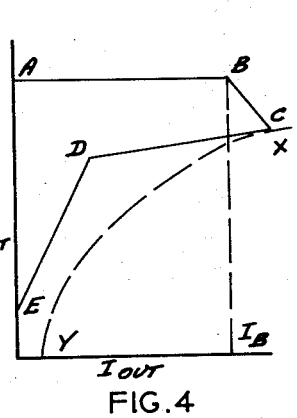
Figure 5:
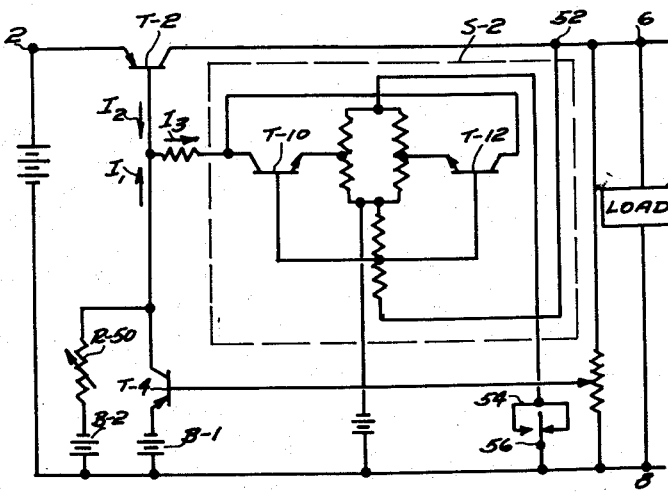
Figure 6:
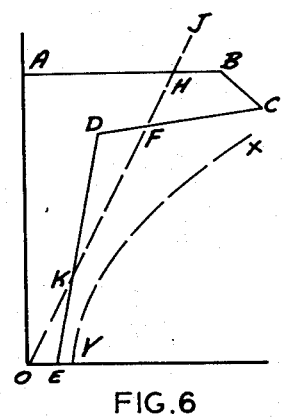

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawings, in which:

FIG. 1 is a schematic diagram illustrating the general nature of a power supply regulator as employed with this invention, FIG. 2 is a graph illustrating the relationships of output voltage, output current and maximum safe power which may be supplied to a circuit such as that shown in FIG. 1, FIG. 3 is a schematic diagram of a transistorized voltage regulator similar to that illustrated in FIG. 1 and includes a shaping circuit to limit the power output to the load to a value not exceeding the safe power drain on the transistors, FIG. 4 is a graph illustrating the characteristic curves which may apply to a circuit such as that shown in FIG. 3 and in particular illustrates the avoidance of characteristics which would lead to the provision of excess power by the transistor circuits, FIG. 5 is a schematic diagram of another embodiment of the invention illustrated in FIG. 3, FIG. 6 illustrates a graph indicating the volt-ampere characteristics of the circuit of FIG. 5 together with a load line and a dashed line indicating the maximum power which may be delivered safely by the circuit.

Preliminary to a more detailed description of this invention, one may refer to FIG. 1, an illustration of some of the features of the prior art devices. In FIG. 1 the D.C. voltage to be regulated is applied between input terminal 2 and a reference terminal (ground). As indicated, the input potential at terminal 2 is applied to the collector electrode of PNP transistor T-2, the collector emitter resistance of which may be varied by changes in base current, herein labelled $I_2$. The potential appearing across output terminals 6, 8 and applied to the load clearly will equal the input potential on the input terminal 2 less the IR drop across the collector-emitter resistance of transistor T-2. A differential amplifier shown includes transistor T-4, the base of which is coupled through a resistor to the output terminal 6 as indicated. A D.C. potential is supplied to the emitter of transistor T-4 from the battery B-2. PNP transistor T-4 will operate to compare the potentials from B-2 and terminal 6 to control the current $I_1$ from its collector. A current supply S of usual type provides a current $I_S$ at terminal 12 in FIG. 1, where the current flow into and away from terminal 12 may be depicted as shown in FIG. 1. When output voltage drops the T-4 base voltage drops, decreasing the T-4 collector current and thereby increasing the base current $I_2$ from the series regulating transistor T-2. Increase in T-2 base current decreases the T-2 collector-emitter resistance, thereby decreasing the drop across T-2 and tending to restore or maintain the voltage constant across the load.

The prior art circuit of FIG. 1 will provide a substantially constant output potential at terminal 6 from a low or zero value of load current up until the voltage on the base of transistor T-4 cuts off the transistor T-4 and decreases current $I_1$ to zero. This portion of the operating range is indicated by the horizontal line AB in FIG. 2. When the output current exceeds the value $I_B$, indicated at B in FIG. 2, the characteristic curve of the circuit will tend to slope down along a line BC with a continued decrease in the voltage output across the load. The power delivered eventually will exceed the limits indicated by the hyperbolic dashed line XY, which indicates the maximum permissible power which can be delivered by the voltage regulator without exceeding the ratings of the transistors. The slope of line BC will be determined by the voltage current characteristics of the current source S and the gain of the variable resistance, series regulating transistor T-2. In order to change the output characteristics of a series voltage regulator circuit of this kind, it thus becomes necessary to change the characteristics of the current source $I_S$ and/or the gain of the variable resistance T-2. Prior art means for effecting such changes have been shown in a patent application by William F. Saunders III, entitled "Voltage Regulator," filed on November 24, 1958, and given Serial No. 776,027. The Saunders application is assigned to the same assignee as the present invention.

In the present invention a basic series regulating circuit such as that of FIG. 1 is provided, and a novel shaping circuit such as that shown within dashed lines at S-1 in FIG. 3 is substituted for the current supply S of FIG. 1. Similar portions of FIG. 3 are numbered in the same fashion as they are in FIG. 1 to facilitate understanding of the invention. The graph of FIG. 4 may be consulted in order to make the explanation of the operation of FIG. 3 more clear.

At load current values below $I_B$, the operation of the two circuits of FIG. 1 and FIG. 3 is similar. When the FIG. 3 circuit reaches point B on its voltage-current characteristic curve, as illustrated in FIG. 4, transistor T-4 will be cut off, reducing current $I_1$ to zero, so that the T-2 base current will equal the $I_S$ current flowing through the T-6 and T-8 collectors. As shown, the T-6 and T-8 collectors are interconnected. For a first range of operation upward from the $I_B$ current value after cut-off of transistor T-4, transistors T-6 and T-8 will be able to supply increasing current $I_S$ to the base of transistor T-2, so that the output current deliverable through transistor T-2 to the load will continue to increase. However, this rise in output current will be at a lower rate than previously, and it will be accompanied by a decrease in voltage, as indicated by line BC. When the output voltage has dropped to the value shown at point C, the potential available to the emitters of transistors T-6 and T-8 from terminal 32 will have decreased to where the $I_2$ that current flowing from the collectors of these two transistors can no longer increase but must instead decrease. Decreases in the current $I_S$ supplied by the collectors will, in turn, increase the T-2 collector-emitter resistance and thereby produce a still greater drop in the output potential, which will be reflected in further drop at the emitters of transistors T-6 and T-8 in a cumulative and regenerative manner, until point D is reached. When load current and output voltage have decreased to point D of FIG. 4, a selected one of the two shaping transistors T-6 and T-8 will be entirely cut-off after which the only current available at $I_S$ for application to the base of transistor T-2 will be from the collector of the other one of the two shaping transistors. This latter current is arranged so that the voltage-current output characteristic will lie along line DE, causing shut down of the circuit when operation reaches the point E.

The circuit at FIG. 3 is primarily of value when the voltage supplied at the output terminal is negative. When the output potential is positive, the shaping circuit must have its connection to the output terminal made to the bases of the transistors as illustrated in FIG. 5. Many portions of the circuit illustrated in FIG. 5 are identical to those illustrated in FIG. 3, and symbols used to identify those circuits in FIG. 3 have been retained in FIG. 5. The shaping circuit S-2 of FIG. 5 closely resembles shaping circuit S-1 of FIG. 3. One principal difference is that the transistor bases are connected to receive the output potential from a terminal such as 52 in FIG. 5, whereas the bases were connected to the ground terminal in FIG. 3. Also, the emitters of transistors T-10 and T-12 of FIG. 5 are connected through suitable resistors to the ground terminal, whereas their counterparts T-6 and T-8 in FIG. 3 were connected to the output terminal 6 through the exact connection at 32. The biasing potentials necessary for operation have not been shown in detail in FIG. 5, since well-known principles are involved, and the biasing voltages will necessarily vary in magnitude and polarity with different types of transistors. In the embodiments shown in FIG. 5, NPN type transistors have been employed as they were in FIG. 3, but it is not intended that this invention should be limited in scope to any single type of transistor.

The operation of the circuit in FIG. 5 is illustrated generally in FIG. 6 and it will be seen that the characteristics of the circuit have been shaped by shaping circuit S-2 in a manner very similar to the technique of FIGS. 3 and 4. In FIG. 6 the load line indicated by the dashed line OJ has been added to illustrate additional features of this invention. The load line as shown in FIG. 6 crosses the line AB at point H, the line CD at F and the line DE at K. This indicates that the circuit has three stable operating points, one at H, one at F, and a third one at K.

With the curve ABCDE representing the voltage current characteristic of the shaping circuit, a reset circuit is necessary. In FIG. 6, if the regulator is overloaded, the voltage will return to point O. If the overload is then removed, and the load is changed to some lower value the output may stabilize at a point K or F and never reach point H. Thus a reset circuit must be employed to return the output to point H. This may be accomplished by the insertion of a fast acting switch between points 54 and 56 of FIG. 5. This switch may be quickly depressed to turn the shaping transistors T-10 and T-12 "on" to supply current to the base of the variable resistance and thus force the circuit to operate along the line AB of FIG. 6. Similar switching means may be applied between terminals 34 and 36 in FIG. 3 to attain the same end.

Additional elements or biasing potentials may be required in order to compensate for effects found in various parts of these circuits. Many such components or biasing potentials will be recognized to apply in accordance with well known principles and need not be mentioned in detail. Examples of such circuits is the battery B-2 which is connected in FIG. 3 and in FIG. 5 through a variable resistor R-50 to the collector of circuit transistor T-4 in order to compensate for variations in current gain $\beta$ of the variable resistance T-2. This circuit has proven to be necessary, since the current $I_3$ is relatively fixed in magnitude.

This invention supplies the need for a fast acting protective device for high current power supplies. From an economic standpoint, a protective device which is strictly a current limiter is not practical for high current supplies because of the large number of transistors which are required in such devices. The instant invention provides characteristics having unique shaping circuits which make it possible to obtain good voltage regulation while a power supply is being operated near its maximum power rating and at the same time assure that the power rating will not be exceeded in the event that the demand of the load suddenly increases.

The circuits presented to illustrate this invention, have been proven to be extremely useful on several counts. In the first place they can be easily adapted to presently used series regulators without modification of the regulating characteristics of the supply. They are extremely sensitive so that even a slight overload will turn-off the voltage which is a very considerable advantage in transistor series regulators. There is very little danger that the power supply or the control circuits illustrated in this invention will be damaged under most usual conditions. The shaping transistors in the shaping circuit serve to protect the series regulator transistor except in the event that they become shorted. Should the shaping transistors open, or the voltage supply fail, the output potential will immediately fall to zero, thereby preventing damage. The shaping transistors themselves operate in either the saturated or cut-off stages and consequently they should not be destroyed under any normal circumstances. The regulator can operate near the transistor power breakdown region without harm for much longer periods of time than has been possible with the prior art devices.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. In a voltage regulating device comprising a line transistor having its emitter-collector circuit in a first line from a first source to a load, a by-pass transistor of the same conductivity type as said line transistor connected through a second source to a second line from said first source to said load, and a shaping circuit connected to the base of said line transistor and the collector of said by-pass transistor and arranged to provide substantially constant current over the working range of the voltage regulating device, a shaping circuit comprising first and second transistors of the opposite conductivity type from said line and by-pass transistors, means for connecting the collectors of said first and said second transistors together and to said base of said line transistor and said collector of said by-pass transistor, means connecting the emitters of said first and said second transistors together and to a resistor network, means connecting said resistor network between second and third terminals, and means connecting the bases of said transistors together and to a terminal connected to said second and said third terminal.

2. In a voltage regulating device comprising a line transistor having its emitter-collector circuit in a first line from a first source to a load, a by-pass transistor of the same conductivity type as said line transistor connected through a second source to a second line from said first source to said load, and a shaping circuit connected to a first terminal to which the base of said line transistor and the collector of said by-pass transistor are connected, and arranged to provide substantially constant current over the working range of the voltage regulating device, a shaping circuit comprising first and second transistors of the opposite type from said line and by-pass transistors, means for connecting the collectors of said first and second transistors together and to said first terminal, means connecting the emitters of said first and second transistors together and to a resistor network, means connecting said resistor network across second and third terminals, and means connecting the bases of said transistors together and to a terminal connected to said second and third terminals.

3. In a voltage regulating device comprising a line transistor having its emitter-collector circuit in a first line from a first source to a load, a by-pass transistor of the same conductivity type as said line transistor connected through a second source to a second line from said first source to said load, and a shaping circuit connected to a first terminal to which the base of said line transistor and the collector of said by-pass transistor are connected, and arranged to provide substantially constant current over the working range of the voltage regulating device, a shaping circuit comprising first and second transistors of the opposite conductivity type from that of said line and said by-pass transistors, means for connecting the collectors of said first and second transistors together and to said first terminal, means connecting the emitters of said first and said second transistors together and to a resistor network, means connecting said resistor network between second and third terminals, means connecting the bases of said transistors together and to a terminal connected to said second and third terminals, and means for connecting said second and third terminals across the output terminals of said voltage regulating device.

4. In a voltage regulating device comprising a line transistor having its emitter-collector circuit in a first line from a first source to a load, a by-pass transistor of the same conductivity type as said line transistor connected through a second source to a second line from said first source to said load, and a shaping circuit connected to a first terminal to which the base of said line transistor and the collector of said by-pass transistor are connected, and arranged to provide substantially constant current over the working range of the voltage regulating device, a shaping circuit comprising second and third terminals, first and second transistors of the conductivity type opposite that of said line and by-pass transistors having their collectors connected together and to said first terminal, said first and said second transistors having their emitters connected to a resistor network placed across said second and said third terminals, said transistors responding to potentials appearing across said second and third terminals and thus supplying constant current to said first terminal with increasing dissipation of power until a predetermined power level is reached, said first and second transistors progressively decreasing said current to said first terminal after said predetermined power level is reached.

5. In a voltage regulating device comprising a line transistor having its emitter-collector circuit in a first line from a first source to a load, a by-pass transistor of the same conductivity type as said line transistor connected through a second source to a second line from said first source to said load, and a shaping circuit connected to a first terminal to which the base of said line transistor and the collector of said by-pass transistor are connected, a shaping circuit comprising second and third terminals, first and second transistors of the opposite conductivity type from that of said line and by-pass transistors having their collectors connected together and to said first terminal, said first and said second transistors having their emitters connected to a resistor network placed across said second and said third terminals, said first and said second transistors having their bases connected together and to a resistance network connected between said second and said third terminals, said first and second transistors responding to potentials appearing across said second and third terminals to supply constant current to said first terminal with increasing dissipation of power in said load until a predetermined power level is reached, said first and second transistors progressively decreasing said current to said first terminal after said predetermined power level is reached.

6. In a voltage regulating device comprising a line transistor having its emitter-collector circuit in a first line from a first source to a load, a by-pass transistor of the same conductivity type as said line transistor connected through a second source through a second line from said first source to said load, and a shaping circuit connected to a first terminal to which the base of said line transistor and the collector of said by-pass transistor are connected, a shaping circuit comprising second and third terminals, first and second transistors of conductivity type opposite to that of said line and by-pass transistors having their collectors connected together and to said first terminal, said first and said second transistors having their emitters connected to a resistor network placed across said second and said third terminals, said transistors responding to potentials appearing across said second and said third terminals to supply constant current to said first terminal with increasing dissipation of power in said load until a predetermined power level is reached, said first and second transistors progressively decreasing said current to said first terminal after said predetermined power level is reached, said shaping circuit thereby providing a control signal which maintains the current through the emitter-collector circuit of said line transistor within the allowable dissipation of said line transistor.

7. In a three terminal network, a line transistor of a first conductivity type having its collector connected to one of said three terminals and its emitter connected to another of said three terminals, a first resistor connecting said emitter to the third of said three terminals, a second transistor of the same conductivity type as said line transistor having its collector connected to the base of said line transistor and its emitter connected through a first direct-current source to said third terminal, a connection between a point on said first resistor and the base of said second transistor, and a third and a fourth transistor of the opposite conductivity truck type from said line transistor and said second transistor having their collectors connected to the base of said line transistor through a second resistor and their emitters connected through a first resistor network and a second direct-current source to said third terminal.

8. In a three terminal network, a line transistor of a first conductivity type having its collector connected to one of said three terminals and its emitter connected to another of said three terminals, a first resistor connecting said emitter to the third of said three terminals, a second transistor of the same conductivity type as said line transistor, having its collector connected to the base of said line transistor and its emitter connected through a first direct-current source to said third terminal, a connection between a point on said first resistor and the base of said second transistor, a third and a fourth transistor of the opposite conductivity type from that of said line transistor and said second transistor having their collectors connected to the base of said line transistor through a second resistor and their emitters connected through a first resistor network to said third terminal and through a second resistor network to said emitter of said line transistor, and a resistor connected between the bases of said third and fourth transistors and the emitter of said line transistor.

9. A three terminal network comprising a line transistor having its collector connected to one of said three terminals and its emitter connected to another of said three terminals, a by-pass transistor of the same conductivity type as that of said line transistor having its collector and its emitter connecting the base of said line transistor through a first direct-current source to the third of said terminals, a connection between the base of said by-pass transistor and an intermediate point on a first resistor connecting the emitter of said line transistor and said third terminal, first and second transistors of opposite conductivity type from that of said line transistor and said by-pass transistor having their collectors connected together and through a second resistor to the base of said line transistor and having substantially constant current exciting their own emitters, and another direct-current source connecting said third terminal to the base of said first and second transistors of opposite type.

10. A three terminal network comprising a line transistor having its collector connected to one of said three terminals and its emitter connected to another of said three terminals, a by-pass transistor of the same conductivity type as that of said line transistor having its collector and its emitter connecting the base of said line transistor through a first direct-current source to the third of said terminals, a connection between the base of said by-pass transistor and an intermediate point on a first resistor connecting the emitter of said line transistor and said third terminal, first and second transistors of the opposite conductivity type from that of said line transistor and said by-pass transistor having their collectors connected together and through a second resistor to the base of said line transistor and having their emitters connected through third and fourth resistors to the emitter of said by-pass transistor, and another resistor connecting said emitter of said line transistor to the bases of said first and second transistors of opposite type.

11. In a system for supplying a variable resistance load with a constant voltage from a direct-current supply, a first adjustable resistor connected between said supply and said load, differential means responsive to the difference between a voltage proportional to load current and a first reference voltage to supply control current to said first adjustable resistor to vary the resistance of said adjustable resistor, said adjustable resistor varying the current to the load and stabilizing the load voltage over a first range of variation of load resistance, means including first and second transistors connected to be responsive to cut-off of control current flow between said differential means and said adjustable resistance to reduce the rate of increase of current through said adjustable resistance over a second range of variation of load resistance, means including said first transistor for decreasing the flow of current through said variable resistance over a third range of variation of load resistance, and means including said second transistor for changing the rate of flow of current through said variable resistance over a fourth range of variation of load resistance, said means for changing the rate of flow of current thus providing means for assuring a constant voltage output over a selected range and for preventing excess power loads beyond that range.

12. In a voltage regulator, first, second, third and fourth terminals and adjustable resistance connected between a first terminal and a second terminal, means for connecting a load across said second and third terminals, said second and third terminals functioning as output terminals, a differential amplifier connected to said second terminal and to a reference potential terminal to provide current proportional to the difference between potentials on said terminals to a fourth terminal, means connecting said fourth terminal to means for controlling said adjustable resistance, means connecting a shaping circuit between said second terminal said third terminal and said fourth terminal, said shaping circuit comprising two transistors coupled together and to fixed potential means tending to maintain the transistors in a saturated conducting condition, said two transistors supplying a constant current to said fourth terminal until the power supplied to said load equals a predetermined level, said differential amplifier supplying a decreasing current to said fourth terminal and reaching the cut-off point as the power supplied to said load equals said predetermined level, said two transistors providing current to said fourth terminal following cut-off of said differential amplifier, said two transistors causing said adjustable resistor to deliver additional current at a decreasing rate to cause a decreasing output potential to appear across the output terminals following further increases in the load, said decreasing output potential causing said transistors to reduce conduction to said fourth terminal and increase the resistance of said adjustable resistor to limit the output of power from said voltage regulator to a safe maximum.

13. A voltage regulator for supplying a load from a direct-current voltage source comprising a three terminal network, a P-N-P line transistor having its collector connected to one of said three terminals and its emitter connected to another of said three terminals, a first resistor connecting said emitter to the third of said three terminals, a second P-N-P transistor having its collector connected to the base of said line transistor and its emitter connected through a first direct-current source to said third terminal, a connection between a point on said first resistor and the base of said second P-N-P transistor, a first and a second N-P-N transistor having their collectors connected together and through a second resistor to the base of said line transistor and their emitters connected through first resistor networks and a second direct-current source of said third terminal, a second resistor network connected between the emitters of said N-P-N transistors and the emitter of said line transistor, and a third direct-current source connected between the bases of said N-P-N transistors and said third terminal, said N-P-N transistors operating in their saturated ranges when said load current is near the low-current end of its operating range.

14. A voltage regulator for supplying a load from a direct-current voltage source comprising a three terminal network, a P-N-P line transistor having its collector connected to one of said three terminals and its emitter connected to another of said three terminals, a first resistor connecting said emitter to the third of said three terminals, a second P-N-P transistor having its collector connected to the base of said line transistor and its emitter connected through a first direct-current source to said third terminal, a connection between a point on said first resistor and the base of said second P-N-P transistor, a first N-P-N transistor and a second N-P-N transistor having their collectors connected together and through a second resistor to the base of said line transistor and their emitters connected through first resistor networks to said third terminal, a second resistor network connected between the emitters of said N-P-N transistors and the emitter of said line transistor, and a resistor connected between the bases of said N-P-N transistors and the emitter of said line transistor, said N-P-N transistors operating in their saturated ranges when said load current is near the low-current end of its operating range.

15. In a voltage regulator, input terminal means, output terminal means, an adjustable resistor device having a main current path, electroresponsive control means associated with said adjustable resistor device for controlling the resistance of the main current path, means connecting the main current path in series with the input and output terminal means for conducting load current to a load connected across the output terminal means, a reference source of voltage, differential means connected for energizing the electro-responsive control means in accordance with the difference between the voltage across the output terminal means and the voltage of said reference source, said electroresponsive control means causing said adjustable resistor to maintain a substantially constant voltage across the output terminal means over a substantial range of variation of load current through said main path, and shaping means connected across said output terminal means and responsive to the voltage across said output terminal means for modifying the energization of the electroresponsive control means to limit the current supplied through said main path to a maximum value, said shaping means including two transistors of like kind having their collectors connected together to said adjustable resistor device and their emitters and bases connected through resistor networks across said output terminals, the first of said two transistors causing said load current to decrease at a first rate after a first selected output votlage has been reached and the second of said two transistors causing said load current to decrease at a second rate after a subsequent selected output voltage has been reached.

16. In a voltage regulator, input terminal means, output terminal means, an adjustable resistor device having a main current path having a safe-current limit and having electro-responsive control means for controlling the resistance of the main current path, means connecting the main current path in series with the input and output terminal means for conducting load current to a load connected across the output terminal means, a reference source of voltage, differential means for energizing the control means in accordance with the difference between the voltage across the output terminal means and the voltage of said reference source to maintain a substantially constant voltage across the output terminal means over a substantial range of variation of load current through said main path within said safe current limits, and shaping means responsive to the load current supplied through the main current path for modifying the energization of the control means to limit the current supplied through said main current path to a maximum value above said range of variation and below said safe-current limit, said shaping means including first and second transistors of like kind having their collectors connected together to said adjustable resistor device and their emitters and bases connected through resistor networks across said output terminals, the first of said two transistors causing said load current to decrease at a first rate after a first selected output potential has been reached and the second of said two transistors causing said load current to decrease at a second rate after a second selected output potential has been reached.

References Cited in the file of this patent
UNITED STATES PATENTS

| | | |
|---|---|---|
| 2,963,637 | Osborn | Dec. 6, 1960 |
| 2,979,653 | Wilcox et al. | Apr. 11, 1961 |